United States Patent [19]

Surabian

[11] Patent Number: 5,318,070
[45] Date of Patent: Jun. 7, 1994

[54] ELECTRIC FAUCET VALVE OPERATOR ADAPTER

[76] Inventor: Edward C. Surabian, 6 Arthur Woods Ave., Burlington, Mass. 01803

[21] Appl. No.: 933,888

[22] Filed: Aug. 21, 1992

Related U.S. Application Data

[63] Continuation-in-part of Ser. No. 747,905, Aug. 19, 1991, abandoned.

[51] Int. Cl.⁵ .............................................. F16K 11/24
[52] U.S. Cl. .................................. 137/606; 137/569; 251/129.04; 251/129.11; 251/248
[58] Field of Search ............... 137/607, 606, 359, 360, 137/594, 597, 569; 4/192, 196, 623, 628; 251/129.04, 129.11, 248

[56] References Cited

U.S. PATENT DOCUMENTS

| | | | |
|---|---|---|---|
| 1,722,960 | 7/1929 | Funston | 137/569 |
| 2,785,546 | 3/1957 | Bauerlein | 137/569 |
| 3,450,159 | 6/1969 | Wilkin | 137/606 |
| 3,639,920 | 2/1972 | Griffin et al. | 4/628 X |
| 3,904,167 | 9/1975 | Touch et al. | 251/14 |
| 4,429,422 | 2/1984 | Wareham | 4/192 |
| 4,580,600 | 4/1986 | Mazzei et al. | 137/597 |
| 4,606,085 | 8/1986 | Davies | 4/628 X |
| 4,785,845 | 11/1988 | Kochal | 137/606 X |
| 4,889,315 | 12/1989 | Imanaga | 251/129.11 X |
| 4,942,631 | 7/1990 | Rosa | 4/628 X |
| 4,945,943 | 8/1990 | Cogger | 137/607 X |

*Primary Examiner*—Stephen M. Hepperle
*Attorney, Agent, or Firm*—Ellen C. Childress

[57] ABSTRACT

A portable electric adapter unit is installed by removing the operating knobs or levers of an existing household faucet and locking the unit to the exposed valve stems. Switches on the unit control motors which drive a gear chain which, In turn, rotate the respective valve stems thereby controlling the temperature and flow of water. A liquid soap dispenser is included in the assembly as well as a pair of switches that allow for setting of the rotation direction of the motors during installation.

4 Claims, 4 Drawing Sheets

ELECTRIC FAUCET VALVE OPERATOR ADAPTER

This application is a continuation-in-part of prior U.S. patent application Ser. No. 07/747,905, filed on Aug. 19, 1991, now abandoned.

BACKGROUND OF THE INVENTION

1. Field of the Invention

This invention relates to electrical control of faucets and more particularly to apparatus for electrically adjusting the amount of flow and temperature of that flow in commercial household mixing faucet including an automatic liquid soap dispenser.

2. Description of the Prior Art

Many present day household faucets include two handles or two knobs and a single spout, rotation of each handle or knob controlling its respective valve opening. One valve controls the flow of hot water and the other valve controls the flow of cold water. The mixture of hot and cold water flows out of the single spout. The temperature and volume of the mixture is controlled by the amount each valve is opened.

Manipulation of the handles or knobs in often difficult for the elderly, particularly those with an arthritic condition. Also children may not have the strength to open a faucet valve that is tightly shut. Faucets for use by the handicapped are designed with huge handles having a long lever arm. But even these long handles may be difficult for one to manage.

U.S. Pat. No. 4,889,315 entitled "Electrically Opening and Closing Faucet Device" describes the electrical control of a faucet having a single spindle controlling a single valve for controlling the flow from a single spigot. There are a number of problems with this design, an aesthetics problem, an operational problem and a mechanical problem.

Great care is taken by Industrial Designers to develop household appliances which are pleasing to the artistic eye and fit the decor of the room. The design of the '315 patent would result in the knob or handle being located in an unsightly position.

The operational problem results because no ready means is described for mixing the hot and cold water to the desired temperature. Note that the electrical sensor control claimed implies that only water having a fixed temperature is supplied.

The mechanical problem results since it not obvious how the invention would be mounted to a household faucet.

Dual valve faucets are designed so that the hot and cold water valves may close in the same direction, or that they may close in the opposite direction. For example, a hot water valve may close in a clockwise direction and the clod water valve may also close in a clockwise direction. On another type of faucet the hot water valve may close in a counter-clockwise direction, while the cold water valve closes in a clockwise direction. It is not obvious how this would be accomplished without an additional switch to change the rotational direction of the drive motor which would change the rotation of the valve. Therefore this would result in a problem whereby depressing the OFF button would turn the water ON, and depressing the ON button would turn the water off.

OBJECTS OF THE INVENTION

Accordingly, it is an object of the invention to have an improved electrically operated household faucet.

It is another object of the invention to have an improved electrically operated household faucet which is readily installed on an existing household faucet.

It is yet another object of the invention to have an improved electrically operated household faucet which fits the decor of the environment.

It is yet another object of the invention to have an improved electrically operated household faucet which is readily operable by the handicapped.

It is still another object of the invention to have an improved electrically operated household faucet which can automatically dispense liquid soap.

SUMMARY OF THE INVENTION

The above objects and advantages are achieved in a preferred embodiment of the present invention. According to the preferred embodiment, the knobs and levers of a commercially available household hot and cold water mixing faucet are replaced by an electrically controlled assembly which is coupled to and held in place by their respective valve stems. Two motors, each geared to drive their respective hot and cold water valve stems through the coupler are controlled by their respective switches and a piston type pump for dispensing liquid soap. The gear ratios are set to simulate the hand operation of a standard faucet.

BRIEF DESCRIPTIONS OF THE DRAWINGS

DESCRIPTION OF THE PREFERRED EMBODIMENT

This invention is a convenient method for the operation of modern kitchen and bathroom faucets. One finger operation makes this unit highly desirable for the elderly and the handicapped who have limited use of their hands. The operating switches are of a touch pad waterproof design. The switches for controlling the flow and temperature of the water are grouped together for easy access. Depressing the 'hot' and 'cold' pads simultaneously results in a desired water temperature. This operation is similar to that of a single lever water faucet.

The modern design makes this invention a welcome alternative to the old style water faucets with knobs and handles that have been standard since its inception. The advanced design fits well with the modern kitchen appliances that incorporate touch pad switches.

The electro-mechanical design will facilitate its manufacture and assembly. It can be made entirely with molded plastic parts with the exception of the electrical components. A detachable battery pack supplies the energy to the two small D.C. motors that open and close the faucet valves through simple gearing systems. Installation takes only minutes with no plumbing involved.

This invention is a credible alternative to the standard operation of today's faucets as is the electric can opener to the hand operated can opener.

Figure 1:
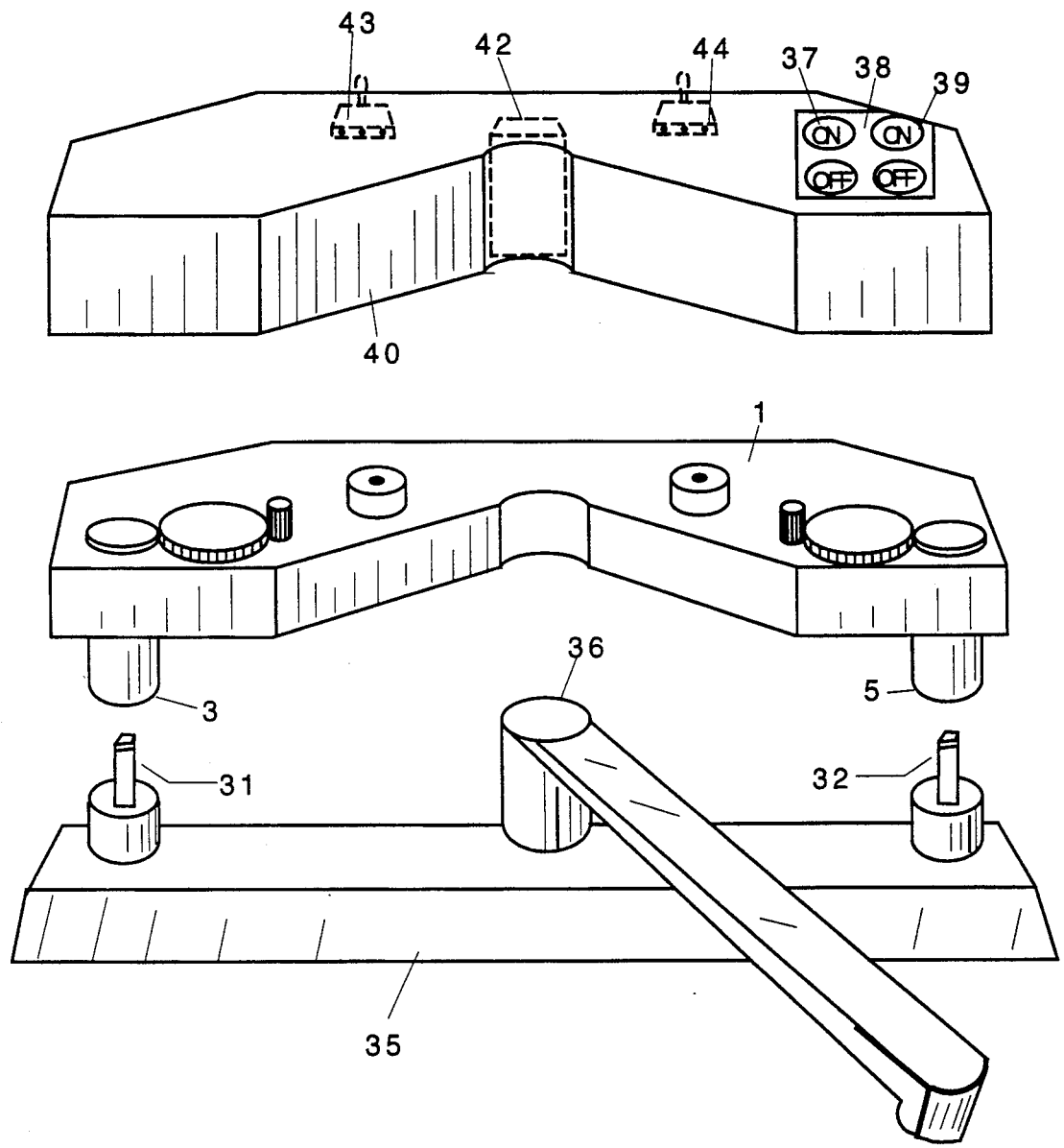
FIG. 1 shows an isometric drawing including a commercially available household faucet, an electrically controlled assembly and a mechanism cover which includes the control switches.

Referring to FIG. 1, a commercial household faucet 35 includes a spigot 36, a valve stem 31 for controlling the flow of hot water and a valve stem 32 for controlling the flow of cold water. The original handles were removed and ar®therefore not shown. A mechanism assembly 1 includes adapters 3 and 5 which cover and control valve stems 31 and 32 respectively. A plastic cover 40 includes a battery pack 42, a 'hot' ON-OFF switch 37 (colored red) and a 'cold' ON-OFF switch 39 (colored blue), both mounted on a switch plate 38. Battery pack 42 is designed for easy replacement of worn batteries. The plastic cover 40 may be manufactured in different colors. These colors would typically match the decor of the sink, counter or room.

Figure 2:
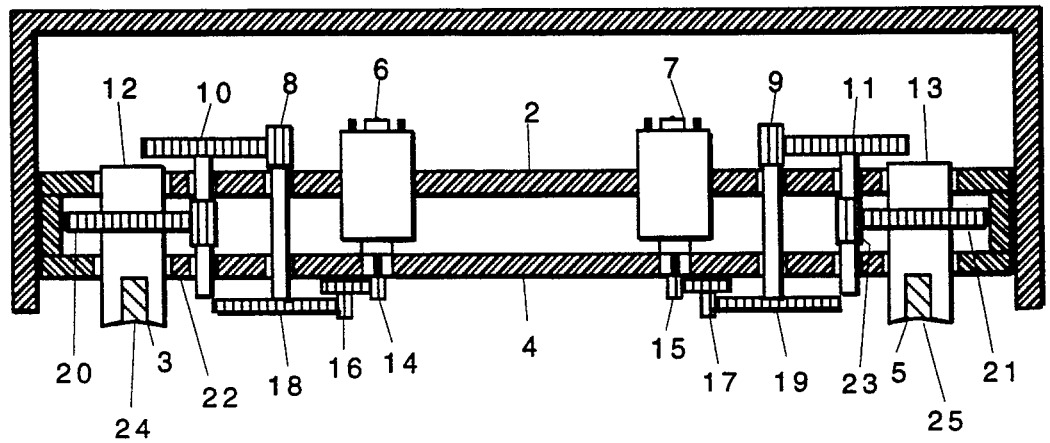
FIG. 2 shows a section through the mechanism assembly.

Referring to FIG. 2, mechanism assembly 1 includes a top gear housing 2 and a bottom gear housing 4. When 'hot' switch 37 is depressed ON or OFF to either turn the hot water ON or OFF, a motor 6 is energized to drive a chain of gears 14, 16, 18, 8, 10, 22 and 20 which in turn drives shaft 12 in the appropriate direction. Shaft 12 includes an aperture 24. Since there are various standard valve stem shapes, such as square, splined and "D" shaped, the appropriate adapter 3 of FIG. 1 is fitted into aperture 24 to manipulate valve stem 31.

Similarly, when 'cold' switch 39 is depressed ON or OFF, a motor 7 is energized to drive a chain of gears 15, 17, 19, 9, 11, 23 and 21 which in turn drives shaft 13 in the appropriate direction. Shaft 13 includes an aperture 25 for holding adapter 5. Adapter 5 of FIG. 1 is fitted into aperture 25 to manipulate valve stem 32. Note that the mechanisms for manipulating valve stems 31 and 32 are mirror images of each other. In the event that valve stems are not mirror images, then switches 43 and 44 of FIG. 1 are preset to establish the direction of rotation of motors 6 and 7 in accordance with the valve ON and OFF positions. The gear ratios are such as to simulate the operation of a standard faucet.

Figure 3:
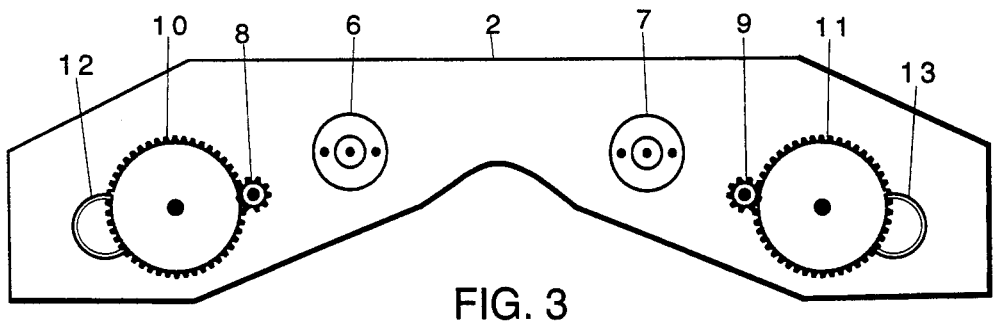
FIG. 3 shows a top view of the of the mechanism assembly.

FIG. 3 shows a top view of mechanical assembly 1 of the motors 6 and 7, gears 8, 9, 10 and 11, and drive shafts 12 and 13 all mounted on plate 2.

Figure 4:
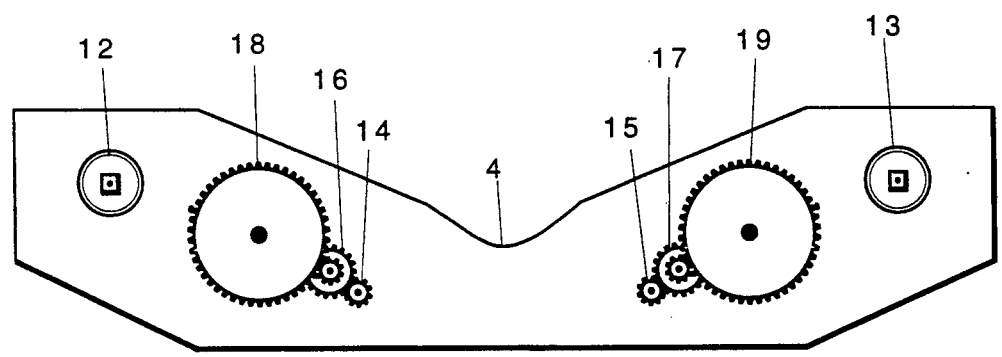
FIG. 4 shows a bottom View of the of the mechanism assembly.

FIG. 4 shows a bottom view of mechanical assembly 1 of the gears 14, 15, 16 17 and 18, and drive shafts 12 and 13 all mounted on plate 4.

Figure 5:
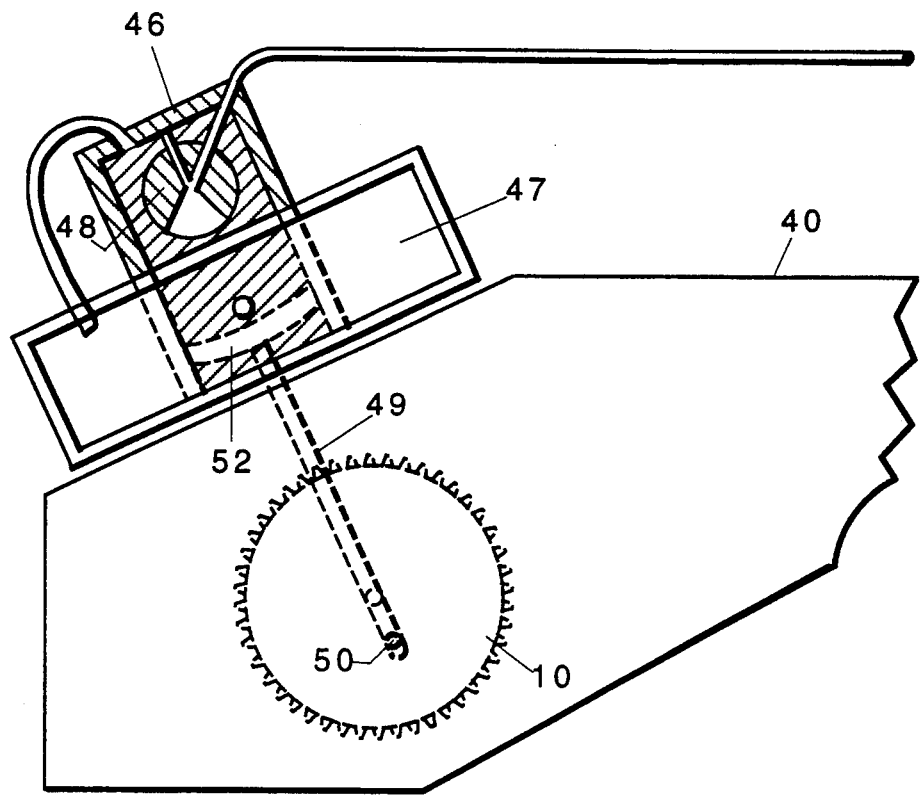
FIG. 5 shows a top view of the soap dispenser assembly.
Figure 6:
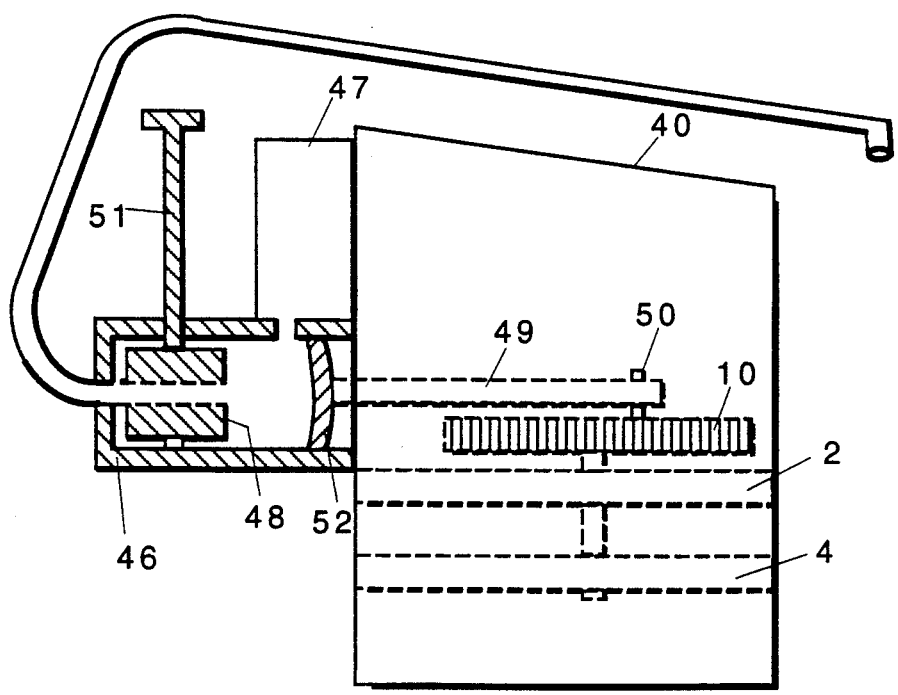
FIG. 6 shows a side view of the soap dispenser assembly.

FIG. 5 shows a liquid soap dispenser assembly 45 which includes a soap reservoir 47, a pump assembly 46 and a diverter valve 48. A connector rod 49 is connected to a piston 52 at one end and a pin 50 which is coupled to gear 10. A shaft 51 is connected to diverter valve 48. Shaft 51, when rotated in one direction, delivers soap to the user. Shaft 51, when rotated in the other direction delivers soap back to the reservoir 47.

While the invention has been shown and described with reference to the preferred embodiment thereof, it will be understood by those skilled in the art that the above and other changes in form and detail may be made therein without departing from the spirit and scope of the invention.

Figure 7:
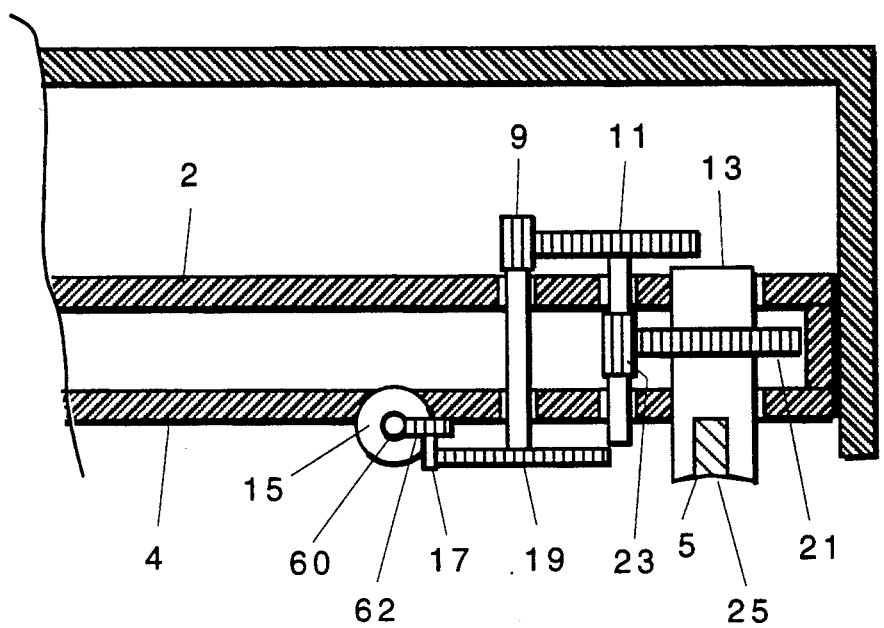
FIG. 7 shows an alternative embodiment having a worm and drive gear.

Typical examples could be by obtaining power for the motors from the house voltage, or by providing different gear chain drives such as a worm 60, and drive gear 62 combination (see FIG. 7).

I claim:

1. An electric adapter for a faucet valve comprising:
   at least one stem adapter fitted to a valve stem of a faucet, said stem adapter being coupled to an output shaft;
   at least one drive mechanism coupled to said said adapter, said drive mechanism including a motor gear, at least one intermediate reduction gear, and a drive gear coupled to said output shaft;
   at least one motor for driving said drive mechanism;
   a source of electrical energy connected to said switch;
   at least one manually actuated switch having a means for driving said drive mechanism bidirectionally;
   a housing for said motor; and
   a soap dispenser, said dispenser further comprising:
   a reservoir;
   a bipositional valve having a first position for manually directing soap and a second position for electromechanically delivering soap; and
   an electromechanical means for actuating said soap delivery, said soap dispenser being seated in said housing.

2. An electric adapter for a faucet valve comprising:
   first and second stem adapters, each adapter fitted to a valve stem of a faucet, said first stem adapter fitting on a hot water valve stem and said second stem adapter fitting on a cold water valve stem, said stem adapters being coupled to an output shaft.; first and second drive mechanisms, each drive mechanism coupled to one said adapter, each drive mechanism including a motor gear, at least one intermediate reduction gear, and a drive gear coupled to said output shaft; first and second motors for driving said drive mechanisms;
   at least one source of electrical energy connected to first and second switches, said switches activating said motors; and at least one manually actuated switch having a means for driving said drive mechanisms bidirectionally;
   wherein said first and second switches operate said drive mechanisms either individually or simultaneously; and
   a third switch for initially setting the rotational direction of said first and second motor means.

3. The adapter of claim 2 further comprising a soap dispenser, said dispenser further comprising:
   a reservoir;
   a bipositional valve having a first position for manually directing soap and a second position for electromechanically delivering soap;
   an electromechanical means for actuating said soap delivery, said soap dispenser being seated in said housing.

4. The adapter of claim 3 wherein said dispenser is connected to at least one intermediate reduction gear, said dispenser further comprising an actuating means.

* * * * *